United States Patent [19]

Patti et al.

[11] Patent Number: 4,974,909
[45] Date of Patent: Dec. 4, 1990

[54] VEHICLE WHEEL COVER ATTACHMENT

[75] Inventors: Anthony J. Patti, Hayward; David J. FitzGerald, Berkeley, both of Calif.

[73] Assignee: Wheel Masters, Inc., San Leandro, Calif.

[21] Appl. No.: 336,772

[22] Filed: Apr. 13, 1989

[51] Int. Cl.⁵ .............................................. B60B 7/06
[52] U.S. Cl. ............................ 301/37 R; 301/37 CM; 301/108 R
[58] Field of Search ............. 301/37 R, 37 CM, 37 S, 301/108 R, 108 S

[56] References Cited

U.S. PATENT DOCUMENTS 2,722,822 11/1955 Thomas ..................... 301/108 R X
3,066,986 12/1962 Hollar ........................... 301/37 SC
4,470,638 9/1984 Bartylla ..................... 301/108 S X
4,626,037 12/1986 Kushner ........................ 301/108 S Primary Examiner—Russell D. Stormer
Attorney, Agent, or Firm—Linval B. Castle

[57] ABSTRACT

Apparatus for attaching an ornamental wheel cover to a vehicle having an extending cylindrical wheel hub. A ring having several attached legs or claws is secured to the hub by overlying the legs on the hub and clamping them in place. In one embodiment the wheel cover is removably attached to the ring with an open circular spring having a plurality of outwardly extending points that engage aligned slits in the ring and a central cup in the wheel cover. In a second embodiment, outwardly bent tabs with threaded holes on the ring are aligned with screw holes in the face of the wheel cover so that ring and wheel cover are interconnected by screws.

1 Claim, 1 Drawing Sheet

U.S. Patent
Dec. 4, 1990
4,974,909
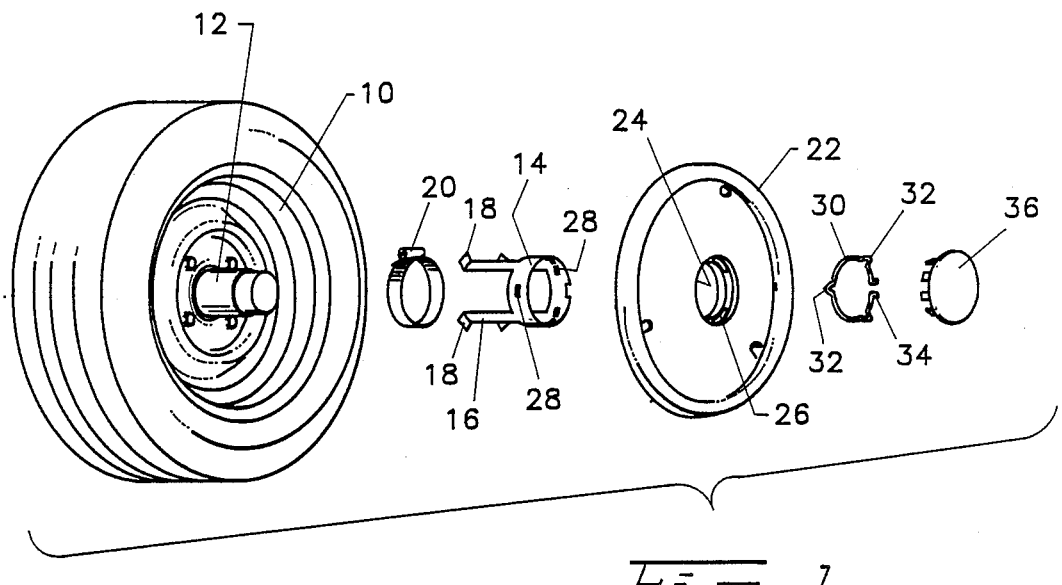
_Fig. 1_
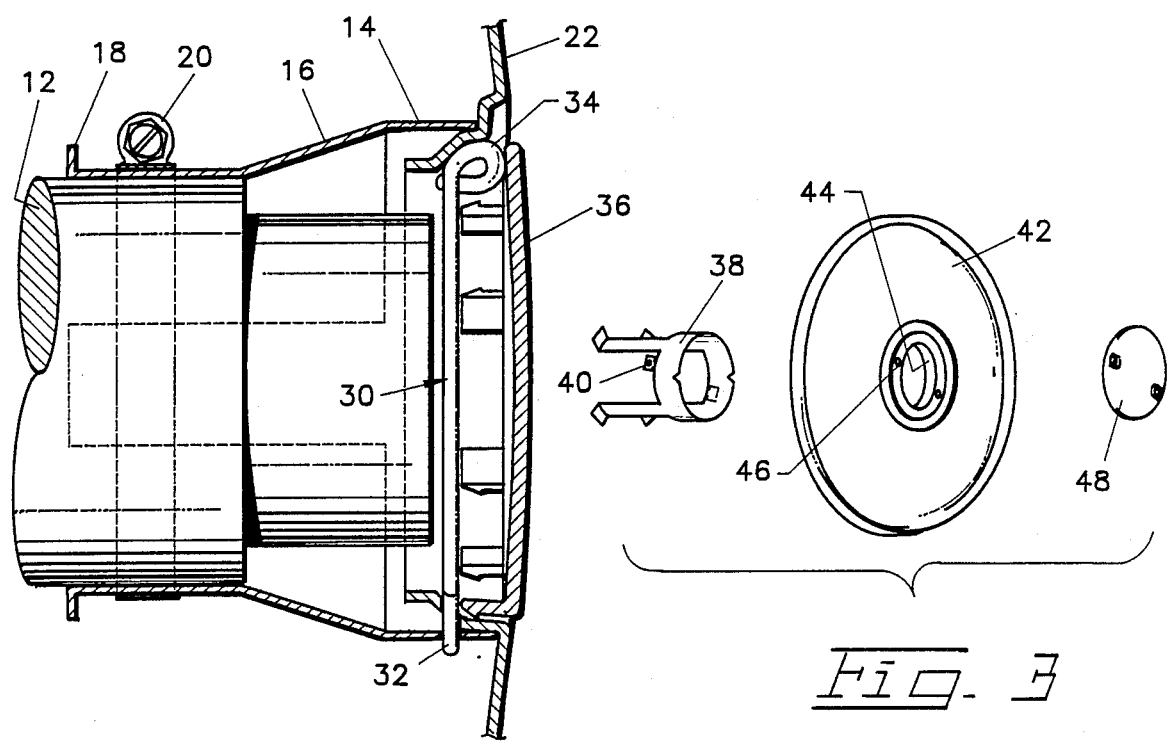
_Fig. 2_
_Fig. 3_

VEHICLE WHEEL COVER ATTACHMENT

BRIEF SUMMARY OF THE INVENTION

This invention relates generally to vehicle wheel covers and particularly to a simple and effective means for mounting an ornamental wheel cover on any wheel having an extending hub with a cylindrical surface.

Most vehicle wheel covers for automobiles, recreation vehicles, and small trailers are attached by resilient edge springs on the covers to the rims of the wheels. While quite adequate for most applications, they are often the source of irritating noises. and are difficult to secure to a wheel. This is a particularly important problem when it is desired to use ornamental wheel covers on vehicles, such as boat trailers, where the wheel covers are to often removed and replaced The attachment of the invention provides for quick and easy removal and reinstallation of a wheel cover and is not a source of noise. It is not only useful for trailers, but may also be used to mount wheel covers on any wheel having an extending hub with a tubular or cylindrical surface, such as the front wheels of light trucks, and are particularly valuable on light 4-wheel drive trucks that require access to the hubs for engaging the front wheel drive.

Briefly described, the wheel cover attachment includes a ring having a plurality of about four legs or claws that are clamped around the cylindrical surface of a hub, such as with a conventional screw-type hose clamp. The claw ring, thus secured to the hub, fits within an annular opening in the center of the ornamental wheel cover. In one embodiment, the wheel cover is secured to the claw ring by an expandable circular spring that fits within corresponding slots in both the wall of the annular opening and the ring. A resilient, ornamental, center emblem cap may then be inserted into the annular opening to present a smooth design.

In a second embodiment the claw ring has, in addition to the plurality of hub engaging legs, two or more female-threaded, outwardly turned tabs which engage a corresponding number of screws that pass through the wheel cover to thus secure the wheel cover to the ring and hub.

BRIEF DESCRIPTION OF THE DRAWINGS

In the drawings which illustrate preferred embodiments of the invention:

FIG. 1 is a perspective view illustrating a wheel and the components forming the wheel cover attachment;

FIG. 2 is an elevational view, partly in section, of a wheel hub and wheel, cover attached thereto; and FIG. 3 is perspective view of a second embodiment and illustrates the attachment of a wheel cover by screwing it to tabs extending from the claw ring.

DETAILED DESCRIPTION

Illustrated in the perspective drawing of FIG. 1 is a vehicle wheel 10 having an extending axle or hub 12 with a cylindrical surface. Such hubs are commonly found on trailers and on the front axles of most small pickup trucks and recreation vehicles. To attach a wheel cover to this type of wheel, a claw ring 14 is attached. The ring 14 is a circular band with a plurality of three or four resilient legs or claws 16 extending parallel with the longitudinal central axis of the band. Each leg preferably has an outwardly turned end tab 18 and the length of each claw 16 to its tab 18 must be adequate to extend over a portion of the wheel hub 12, as shown in FIG. 2. When so extending over and grasping the hub 12, the claws 16 may be tightly secured to the hub by a screw-type stainless-steel hose clamp 20 that encircles the hub 12 and claws 16 and which is prevented from slipping off the ends of the claws by the tabs 18 at the end of each claw. If desired, the need for the clamp 20 may be eliminated by installing the claw 16 around the hub before the mounting of the wheel. After the wheel is mounted and secured by its lug bolts, the claw tabs 18 will be securely clamped behind the wheel.

The ornamental wheel cover 22 to be secured to the wheel 10 has a central opening 24 with a circular internal wall forming a cup. In the internal wall of the opening are two or more elongated slits 26 through the wall. In the circular band of the claw ring 14 are an identical number of similar slits 28, the slits being positioned so that those in the opening in the wheel cover are aligned with those in the claw ring when the circular claw ring 14 is applied over or within the cup formed by the central opening 24 in the wheel cover 22.

When the claw ring 14 is coupled to the wheel cover 22 with the slit in each aligned, a generally circular resilient spring 30 attaches the two units together. The spring 30 is formed with a plurality of sharp outward pointing peaks 32 formed in the plane of the spring and spaced to correspond to the slits 26 and 28 in the wheel cover 22 and claw ring 14. The spring 30 is a compression spring that expands into the slits in the wheel cover and claw ring to thereby lock together these two units and secure the wheel cover 22 to the wheel 12. The spring 30 is an open circle with loops 34 to enable one to pinch the spring ends together to quickly release the spring peaks 32 from the splits for removal of the wheel cover.

FIG. 3 is a perspective view illustrating a second embodiment of the wheel cover attachment. In this embodiment, the claw ring 38 with its plurality of hub hugging claws has, in addition, at least two small outwardly extending tabs 40 which have threaded holes that are aligned with corresponding holes 46 positioned around the central opening 44 in an ornamental wheel cover 42. The wheel cover is then secured to the claw ring 38 and the vehicle wheel by merely screwing the two members together. If desired, an ornamental emblem cap 48 with corresponding screw holes is preferably applied to cover the hub opening in the wheel cover prior to screwing the wheel cover to the claw ring 38.

We claim:

1. A wheel cover attachment for a vehicle wheel having an extension hub with a cylindrical external surface, said attachment comprising:
   a ring member having an attached plurality of substantially equally spaced legs extending in one direction substantially parallel with the central axis of said ring member and in contact with the external surface of said hub;
   clamping means for securing said plurality of legs to said external surface;
   a wheel cover having an axial opening with a circular internal wall forming a cup; and
   attachment means for removably attaching said cup to said ring member, said attachment means including an open circular compression spring having a plurality of outwardly pointing points, each point in said plurality engaging aligned slits cut in said ring member and in said cup in said wheel cover.

* * * * *